(12) United States Patent
Xu et al.

(10) Patent No.: US 7,855,827 B2
(45) Date of Patent: Dec. 21, 2010

(54) INTERNAL OPTICAL ISOLATION STRUCTURE FOR INTEGRATED FRONT OR BACK LIGHTING

(75) Inventors: Gang Xu, Cupertino, CA (US); Alan Lewis, Sunnyvale, CA (US); Brian Gally, Los Gatos, CA (US); Mark Mienko, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 33 days.

(21) Appl. No.: 11/544,978

(22) Filed: Oct. 6, 2006

(65) Prior Publication Data

US 2008/0084602 A1    Apr. 10, 2008

(51) Int. Cl.
G02B 26/00 (2006.01)
G02F 1/29 (2006.01)

(52) U.S. Cl. .................. 359/296; 359/290; 359/318

(58) Field of Classification Search ......... 359/290–292, 359/245, 223–225, 198, 260–263, 298, 301–303, 359/317–318, 295
See application file for complete search history.

(56) References Cited

U.S. PATENT DOCUMENTS

| | | | |
|---|---|---|---|
| 3,924,929 A | 12/1975 | Holmen | |
| 4,375,312 A | 3/1983 | Tangonan | |
| 4,378,567 A | 3/1983 | Mir | |
| 4,850,682 A | 7/1989 | Gerritsen | |
| 4,918,577 A | 4/1990 | Furudate | |
| 4,974,942 A | 12/1990 | Gross | |
| 5,050,946 A | 9/1991 | Hathaway | |
| 5,226,099 A | 7/1993 | Mignardi et al. | |
| 5,291,314 A | 3/1994 | Agranat | |
| 5,339,179 A | 8/1994 | Rudisil | |
| 5,452,385 A | 9/1995 | Izumi | |
| 5,467,417 A | 11/1995 | Nakamura | |
| 5,481,385 A | 1/1996 | Zimmerman et al. | |
| 5,515,184 A | 5/1996 | Caulfield | |

(Continued)

FOREIGN PATENT DOCUMENTS

CN    1381752    11/2002

(Continued)

OTHER PUBLICATIONS

PCT International Search Report and Written Opinion in PCT/US2007/22736, Aug. 14, 2008.

(Continued)

*Primary Examiner*—Scott J Sugarman
*Assistant Examiner*—Dawayne A Pinkney
(74) *Attorney, Agent, or Firm*—Knobbe, Martens, Olson & Bear LLP

(57) ABSTRACT

An optical isolation structure is incorporated into a display between the display elements and the transparent substrate for the display elements. The optical isolation structure reflects light rays within the substrate that impact the structure at high angles relative to normal to the structure, thereby permitting the substrate to be used as an integrated light guide for distributing light over the display from a light source on the edge of the substrate. The optical isolation structure may include a single layer having an index of refraction less than the substrate or a plurality of thin-film interference layers.

61 Claims, 12 Drawing Sheets

U.S. PATENT DOCUMENTS

| | | |
|---|---|---|
| 5,555,160 A | 9/1996 | Tawara |
| 5,592,332 A | 1/1997 | Nishio |
| 5,594,830 A | 1/1997 | Winston |
| 5,647,036 A | 7/1997 | Deacon et al. |
| 5,650,865 A | 7/1997 | Smith |
| 5,659,410 A | 8/1997 | Koike |
| 5,671,994 A | 9/1997 | Tai et al. |
| 5,673,128 A | 9/1997 | Ohta et al. |
| 5,703,667 A | 12/1997 | Ochiai |
| 5,735,590 A | 4/1998 | Kashima |
| 5,771,321 A | 6/1998 | Stern |
| 5,783,614 A | 7/1998 | Chen et al. |
| 5,808,708 A | 9/1998 | Oyama et al. |
| 5,810,464 A | 9/1998 | Ishikawa |
| 5,854,872 A | 12/1998 | Tai |
| 5,883,684 A | 3/1999 | Millikan et al. |
| 5,892,598 A | 4/1999 | Asakawa |
| 5,913,594 A | 6/1999 | Iimura |
| 5,956,106 A | 9/1999 | Petersen |
| 5,982,540 A | 11/1999 | Koike et al. |
| 6,014,192 A | 1/2000 | Lehureau |
| 6,040,937 A | 3/2000 | Miles |
| 6,048,071 A | 4/2000 | Sawayama |
| 6,055,090 A | 4/2000 | Miles |
| 6,068,382 A | 5/2000 | Fukui |
| 6,073,034 A | 6/2000 | Jacobsen |
| 6,074,069 A | 6/2000 | Chao-Ching |
| 6,091,469 A | 7/2000 | Naito |
| 6,099,134 A | 8/2000 | Taniguchi |
| 6,128,077 A | 10/2000 | Jovin |
| 6,151,089 A | 11/2000 | Yang et al. |
| 6,195,196 B1 | 2/2001 | Kimura et al. |
| 6,196,691 B1 | 3/2001 | Ochiai |
| 6,199,989 B1 | 3/2001 | Maeda et al. |
| 6,232,937 B1 | 5/2001 | Jacobsen |
| 6,259,082 B1 | 7/2001 | Fujimoto et al. |
| 6,273,577 B1 | 8/2001 | Goto |
| 6,292,504 B1 | 9/2001 | Halmos |
| 6,322,901 B1 | 11/2001 | Bawendi |
| 6,323,892 B1 | 11/2001 | Mihara |
| 6,371,623 B1 | 4/2002 | Toyoda |
| 6,407,785 B1 | 6/2002 | Yamazaki |
| 6,412,969 B1 | 7/2002 | Torihara |
| 6,454,452 B1 | 9/2002 | Sasagawa |
| 6,456,279 B1 | 9/2002 | Kubo |
| 6,478,432 B1 | 11/2002 | Dyner |
| 6,504,589 B1 | 1/2003 | Kashima |
| 6,512,626 B1 | 1/2003 | Schmidt |
| 6,522,794 B1 | 2/2003 | Bischel et al. |
| 6,582,095 B1 | 6/2003 | Toyoda |
| 6,592,234 B2 | 7/2003 | Epstein |
| 6,598,987 B1 | 7/2003 | Parikka |
| 6,603,520 B2 | 8/2003 | Umemoto |
| 6,631,998 B2 | 10/2003 | Egawa et al. |
| 6,636,358 B2 | 10/2003 | Umemoto et al. |
| 6,642,913 B1 | 11/2003 | Kimura et al. |
| 6,643,067 B2 | 11/2003 | Miyamae |
| 6,650,455 B2 | 11/2003 | Miles |
| 6,652,109 B2 | 11/2003 | Nakamura |
| 6,657,683 B2 | 12/2003 | Richard |
| 6,660,997 B2 | 12/2003 | Laberge |
| 6,669,350 B2 | 12/2003 | Yamashita |
| 6,674,562 B1 | 1/2004 | Miles |
| 6,680,792 B2 | 1/2004 | Miles |
| 6,693,690 B2 | 2/2004 | Umemoto |
| 6,709,123 B2 | 3/2004 | Flohr |
| 6,742,907 B2 | 6/2004 | Funamoto et al. |
| 6,742,921 B2 | 6/2004 | Umemoto |
| 6,751,023 B2 | 6/2004 | Umemoto et al. |
| 6,761,461 B2 | 7/2004 | Mizutani et al. |
| 6,773,126 B1 | 8/2004 | Hatjasalo et al. |
| 6,778,746 B2 | 8/2004 | Charlton |
| 6,792,293 B1 | 9/2004 | Awan et al. |
| 6,794,119 B2 | 9/2004 | Miles |
| 6,798,469 B2 | 9/2004 | Kimura |
| 6,819,380 B2 | 11/2004 | Wen et al. |
| 6,829,258 B1 | 12/2004 | Carlisle et al. |
| 6,852,396 B1 | 2/2005 | Mineo |
| 6,853,418 B2 | 2/2005 | Suzuki et al. |
| 6,862,141 B2 | 3/2005 | Olczak |
| 6,864,882 B2 | 3/2005 | Newton |
| 6,865,312 B2 | 3/2005 | Niv et al. |
| 6,879,354 B1 | 4/2005 | Sawayama |
| 6,883,934 B2 | 4/2005 | Kawakami |
| 6,891,530 B2 | 5/2005 | Umemoto |
| 6,897,855 B1 | 5/2005 | Matthies |
| 6,930,816 B2 | 8/2005 | Mochizuki |
| 6,951,401 B2 | 10/2005 | Van Hees et al. |
| 6,961,045 B2 | 11/2005 | Tsao |
| 6,964,484 B2 | 11/2005 | Gupta |
| 7,010,212 B2 | 3/2006 | Emmons et al. |
| 7,018,088 B2 | 3/2006 | Yu |
| 7,025,461 B2 | 4/2006 | Veligdan |
| 7,042,444 B2 | 5/2006 | Cok |
| 7,042,643 B2 | 5/2006 | Miles |
| 7,054,045 B2 | 5/2006 | McPheters |
| 7,056,001 B2 | 6/2006 | Chuang |
| 7,061,226 B2 | 6/2006 | Durr |
| 7,072,096 B2 | 7/2006 | Holman et al. |
| 7,110,158 B2 | 9/2006 | Miles |
| 7,123,216 B1 | 10/2006 | Miles |
| 7,142,347 B2 | 11/2006 | Islam |
| 7,156,546 B2 | 1/2007 | Higashiyama |
| 7,161,136 B1 | 1/2007 | Wenstrand |
| 7,180,672 B2 | 2/2007 | Olczak |
| 7,206,133 B2 | 4/2007 | Cassarly |
| 7,212,345 B2 | 5/2007 | Wilson |
| 7,218,812 B2 | 5/2007 | Maxwell |
| 7,221,418 B2 | 5/2007 | Lee |
| 7,223,010 B2 | 5/2007 | Min |
| 7,262,754 B1 | 8/2007 | Yamazaki |
| 7,262,916 B2 | 8/2007 | Kao |
| 7,324,284 B2 | 1/2008 | Olczak |
| 7,346,251 B2 | 3/2008 | Bose |
| 7,352,501 B2 | 4/2008 | Chopra et al. |
| 7,352,940 B2 | 4/2008 | Charters |
| 7,355,780 B2 * | 4/2008 | Chui et al. .................. 359/290 |
| 7,357,552 B2 | 4/2008 | Takada |
| 7,357,557 B2 | 4/2008 | Miyashita |
| 7,359,011 B2 | 4/2008 | Hamada |
| 7,366,393 B2 | 4/2008 | Cassarly |
| 7,377,678 B2 | 5/2008 | Huang |
| 7,380,969 B2 | 6/2008 | Yamashita |
| 7,380,970 B2 | 6/2008 | Hwang |
| 7,389,476 B2 | 6/2008 | Senda et al. |
| 7,417,784 B2 | 8/2008 | Sasagawa |
| 7,450,295 B2 | 11/2008 | Tung |
| 7,477,809 B1 | 1/2009 | Tan et al. |
| 7,545,569 B2 | 1/2009 | Cassarly |
| 7,515,336 B2 * | 4/2009 | Lippey et al. ............... 359/443 |
| 7,532,800 B2 | 5/2009 | Iimura |
| 7,564,612 B2 | 7/2009 | Chui |
| 7,603,001 B2 | 10/2009 | Wang |
| 7,663,714 B2 | 2/2010 | Haga et al. |
| 7,706,050 B2 | 4/2010 | Sampsell |
| 2001/0003504 A1 | 6/2001 | Ishihara |
| 2001/0010630 A1 | 8/2001 | Umemoto |
| 2001/0019380 A1 | 9/2001 | Ishihara |
| 2001/0019479 A1 | 9/2001 | Nakabayashi et al. |
| 2001/0022636 A1 | 9/2001 | Yang et al. |
| 2001/0030861 A1 | 10/2001 | Oda |
| 2001/0055208 A1 | 12/2001 | Kimura |
| 2002/0006036 A1 | 1/2002 | Egawa et al. |
| 2002/0034071 A1 | 3/2002 | Mabuchi |

| | | |
|---|---|---|
| 2002/0044445 A1 | 4/2002 | Bohler |
| 2002/0051354 A1 | 5/2002 | Egawa |
| 2002/0054258 A1 | 5/2002 | Kondo et al. |
| 2002/0106182 A1 | 8/2002 | Kawashima |
| 2002/0135560 A1 | 9/2002 | Akaoka |
| 2002/0149584 A1 | 10/2002 | Simpson |
| 2002/0154256 A1 | 10/2002 | Gotoh |
| 2002/0172039 A1 | 11/2002 | Inditsky |
| 2002/0180910 A1 | 12/2002 | Umemoto |
| 2003/0012009 A1 | 1/2003 | Suzuki |
| 2003/0016930 A1 | 1/2003 | Inditsky |
| 2003/0030764 A1 | 2/2003 | Lee |
| 2003/0067760 A1 | 4/2003 | Jagt |
| 2003/0071947 A1 | 4/2003 | Shiraogawa |
| 2003/0081154 A1 | 5/2003 | Coleman |
| 2003/0083429 A1 | 5/2003 | Smith et al. |
| 2003/0086030 A1 | 5/2003 | Taniguchi |
| 2003/0086031 A1 | 5/2003 | Taniguchi |
| 2003/0090887 A1 | 5/2003 | Igarashi |
| 2003/0095401 A1 | 5/2003 | Hanson |
| 2003/0098957 A1 | 5/2003 | Haldiman |
| 2003/0099118 A1 | 5/2003 | Saitoh et al. |
| 2003/0103177 A1 | 6/2003 | Maeda |
| 2003/0103344 A1 | 6/2003 | Niida |
| 2003/0123245 A1 | 7/2003 | Parker |
| 2003/0160919 A1 | 8/2003 | Suzuki et al. |
| 2003/0169385 A1 | 9/2003 | Okuwaki |
| 2003/0184989 A1 | 10/2003 | Matsumoto et al. |
| 2003/0193630 A1 | 10/2003 | Chiou |
| 2003/0210222 A1 | 11/2003 | Ogiwara et al. |
| 2003/0210367 A1 | 11/2003 | Nakano et al. |
| 2003/0214728 A1 | 11/2003 | Olczak |
| 2003/0231483 A1 | 12/2003 | Higashiyama |
| 2004/0001169 A1 | 1/2004 | Saiki et al. |
| 2004/0017599 A1 | 1/2004 | Yang |
| 2004/0027315 A1 | 2/2004 | Senda et al. |
| 2004/0032401 A1 | 2/2004 | Nakazawa |
| 2004/0032659 A1 | 2/2004 | Drinkwater |
| 2004/0042233 A1 | 3/2004 | Suzuki |
| 2004/0070711 A1 | 4/2004 | Wen et al. |
| 2004/0080938 A1 | 4/2004 | Holman |
| 2004/0085748 A1 | 5/2004 | Sugiura |
| 2004/0100796 A1 | 5/2004 | Ward |
| 2004/0109305 A1 | 6/2004 | Chisholm et al. |
| 2004/0135494 A1 | 7/2004 | Miyatake |
| 2004/0170373 A1 | 9/2004 | Kim |
| 2004/0207995 A1 | 10/2004 | Park |
| 2004/0228112 A1 | 11/2004 | Takata |
| 2004/0246743 A1 | 12/2004 | Lee et al. |
| 2005/0024849 A1 | 2/2005 | Parker |
| 2005/0041175 A1 | 2/2005 | Akiyama |
| 2005/0046011 A1 | 3/2005 | Chen |
| 2005/0069254 A1 | 3/2005 | Schultheis et al. |
| 2005/0120553 A1 | 6/2005 | Brown |
| 2005/0133761 A1 | 6/2005 | Thielemans |
| 2005/0141065 A1 | 6/2005 | Masamoto |
| 2005/0146897 A1 | 7/2005 | Mimura et al. |
| 2005/0179977 A1 | 8/2005 | Chui |
| 2005/0195175 A1 | 9/2005 | Anderson |
| 2005/0195468 A1 | 9/2005 | Sampsell |
| 2005/0206802 A1 | 9/2005 | Creemers |
| 2005/0231977 A1 | 10/2005 | Hayakawa |
| 2005/0248524 A1 | 11/2005 | Feng |
| 2005/0253980 A1 | 11/2005 | Saito |
| 2005/0254771 A1 | 11/2005 | Yamashita |
| 2005/0259939 A1 | 11/2005 | Rinko |
| 2005/0271325 A1 | 12/2005 | Anderson |
| 2005/0286113 A1 | 12/2005 | Miles |
| 2006/0001942 A1 | 1/2006 | Chui |
| 2006/0002141 A1 | 1/2006 | Ouderkirk |
| 2006/0002675 A1 | 1/2006 | Choi |
| 2006/0024017 A1 | 2/2006 | Page |
| 2006/0044523 A1 | 3/2006 | Teijido |
| 2006/0050032 A1 | 3/2006 | Gunner |
| 2006/0051048 A1 | 3/2006 | Gardiner |
| 2006/0061705 A1 | 3/2006 | Onishi |
| 2006/0062016 A1 | 3/2006 | Dejima |
| 2006/0066541 A1 | 3/2006 | Gally |
| 2006/0066586 A1 | 3/2006 | Gally |
| 2006/0066783 A1 | 3/2006 | Sampsell |
| 2006/0066935 A1 | 3/2006 | Cummings et al. |
| 2006/0072315 A1 | 4/2006 | Han et al. |
| 2006/0072339 A1 | 4/2006 | Li et al. |
| 2006/0077123 A1 | 4/2006 | Gally et al. |
| 2006/0083028 A1 | 4/2006 | Sun et al. |
| 2006/0110090 A1 | 5/2006 | Ellwood |
| 2006/0114244 A1 | 6/2006 | Saxena |
| 2006/0126142 A1 | 6/2006 | Choi |
| 2006/0132383 A1 | 6/2006 | Gally |
| 2006/0146575 A1 | 7/2006 | Saito |
| 2006/0164861 A1 | 7/2006 | Maeda |
| 2006/0181866 A1 | 8/2006 | Jung |
| 2006/0181903 A1 | 8/2006 | Okuwaki |
| 2006/0187676 A1 | 8/2006 | Ishikura |
| 2006/0198013 A1 | 9/2006 | Sampsell |
| 2006/0209012 A1 | 9/2006 | Hagood |
| 2006/0209385 A1 | 9/2006 | Liu et al. |
| 2006/0215958 A1 | 9/2006 | Yeo |
| 2006/0265919 A1 | 11/2006 | Huang |
| 2006/0268574 A1 | 11/2006 | Jung |
| 2006/0274400 A1 | 12/2006 | Miles |
| 2006/0285356 A1 | 12/2006 | Tseng |
| 2007/0064294 A1 | 3/2007 | Hoshino et al. |
| 2007/0081360 A1 | 4/2007 | Bailey |
| 2007/0116424 A1 | 5/2007 | Ting |
| 2007/0147087 A1 | 6/2007 | Parker |
| 2007/0153243 A1 | 7/2007 | Mestha et al. |
| 2007/0177405 A1 | 8/2007 | Chan |
| 2007/0189036 A1 | 8/2007 | Chen |
| 2007/0196040 A1 | 8/2007 | Wang |
| 2007/0201234 A1 | 8/2007 | Ottermann |
| 2007/0210163 A1 | 9/2007 | Han |
| 2007/0229737 A1 | 10/2007 | Takeda |
| 2007/0229936 A1 | 10/2007 | Miles |
| 2007/0241340 A1 | 10/2007 | Pan |
| 2007/0253717 A1 | 11/2007 | Charters |
| 2007/0268695 A1 | 11/2007 | Seetzen |
| 2007/0279727 A1 | 12/2007 | Gandhi |
| 2007/0285406 A1 | 12/2007 | Kukulj |
| 2007/0292091 A1 | 12/2007 | Fujii |
| 2007/0297191 A1 | 12/2007 | Sampsell |
| 2008/0049445 A1 | 2/2008 | Harbers |
| 2008/0049450 A1 | 2/2008 | Sampsell |
| 2008/0074402 A1 | 3/2008 | Cornish |
| 2008/0079687 A1 | 4/2008 | Cernasov |
| 2008/0084600 A1 | 4/2008 | Bita et al. |
| 2008/0084602 A1 | 4/2008 | Xu |
| 2008/0090025 A1 | 4/2008 | Freking |
| 2008/0094853 A1 | 4/2008 | Kim |
| 2008/0100900 A1 | 5/2008 | Chui |
| 2008/0170414 A1 | 7/2008 | Wang |
| 2008/0180956 A1 | 7/2008 | Gruhlke |
| 2008/0232135 A1 | 9/2008 | Kinder |
| 2008/0267572 A1 | 10/2008 | Sampsell |
| 2008/0285307 A1 | 11/2008 | Aylward |
| 2009/0050454 A1 | 2/2009 | Matsukawa |
| 2009/0090611 A1 | 4/2009 | Zeijlon |
| 2009/0097100 A1 | 4/2009 | Gally |
| 2009/0126777 A1 | 5/2009 | Khazeni et al. |
| 2009/0126792 A1 | 5/2009 | Gruhlke |
| 2009/0135469 A1 | 5/2009 | Lee et al. |
| 2009/0147332 A1 | 6/2009 | Bita |
| 2009/0147535 A1 | 6/2009 | Mienko |
| 2009/0168459 A1 | 7/2009 | Holman |
| 2009/0190373 A1 | 7/2009 | Bita et al. |
| 2009/0201301 A1 | 8/2009 | Mienko |

| | | | | | | |
|---|---|---|---|---|---|---|
| 2009/0201565 | A1 | 8/2009 | Bita et al. | JP | 2000 081848 | 3/2000 |
| 2009/0201571 | A1 | 8/2009 | Gally | JP | 2000 181367 | 6/2000 |
| 2009/0231877 | A1 | 9/2009 | Mienko | JP | 2000 193933 | 7/2000 |
| 2009/0251752 | A1 | 10/2009 | Gruhlke | JP | 2001-021883 | 1/2001 |
| 2009/0296193 | A1 | 12/2009 | Bita et al. | JP | 2002 72284 | 3/2002 |
| 2009/0303746 | A1 | 12/2009 | Wang | JP | 2002 090549 | 3/2002 |
| 2009/0320899 | A1 | 12/2009 | Schiavoni | JP | 2002 108227 | 4/2002 |
| 2009/0323144 | A1 | 12/2009 | Gruhlke | JP | 2002 196151 | 7/2002 |
| 2009/0323153 | A1 | 12/2009 | Sampsell | JP | 2002 245835 | 8/2002 |
| 2010/0026727 | A1 | 2/2010 | Bita et al. | JP | 2003 007114 | 1/2003 |
| 2010/0141557 | A1 | 6/2010 | Gruhlke | JP | 2003 057652 | 2/2003 |
| | | | | JP | 2003 173713 | 6/2003 |
| FOREIGN PATENT DOCUMENTS | | | | JP | 2003 188959 | 7/2003 |
| | | | | JP | 2003 315694 | 11/2003 |
| DE | 196 22 748 | | 12/1997 | JP | 2003 344881 | 12/2003 |
| DE | 199 42 513 | | 3/2001 | JP | 2005 259365 | 9/2005 |
| DE | 102007025092 | | 12/2008 | JP | 2006 107993 | 4/2006 |
| EP | 0 278 038 | | 8/1988 | JP | 2006 120571 | 5/2006 |
| EP | 0278038 | A | 8/1988 | TW | 567388 | 12/2003 |
| EP | 0 539 099 | | 4/1993 | WO | WO 94/06871 A1 | 3/1994 |
| EP | 0 590 511 | | 4/1994 | WO | WO 95/01584 | 1/1995 |
| EP | 0 621 500 | | 10/1994 | WO | WO 97/01240 | 1/1997 |
| EP | 0 879 991 A2 | | 11/1998 | WO | WO 98/19201 | 5/1998 |
| EP | 0 907 050 | | 4/1999 | WO | WO 98/32047 | 7/1998 |
| EP | 0 957 392 A1 | | 11/1999 | WO | WO 98/35182 | 8/1998 |
| EP | 0 984 314 | | 3/2000 | WO | WO 99/63394 | 12/1999 |
| EP | 1 079 264 | | 2/2001 | WO | WO 00/50807 A1 | 8/2000 |
| EP | 1 093 105 | | 4/2001 | WO | WO 01/29148 | 4/2001 |
| EP | 1 113 218 | | 7/2001 | WO | WO 01/57434 | 8/2001 |
| EP | 1 116 987 | | 7/2001 | WO | WO 157434 A1 | 8/2001 |
| EP | 1 127 984 | | 8/2001 | WO | WO 01/84228 | 11/2001 |
| EP | 1 143 270 | | 10/2001 | WO | WO 01/84229 | 11/2001 |
| EP | 1 199 512 A1 | | 4/2002 | WO | WO 02/06858 | 1/2002 |
| EP | 1 251 454 | | 10/2002 | WO | WO 02/071132 | 9/2002 |
| EP | 1 271 223 | | 1/2003 | WO | WO 02/097324 | 12/2002 |
| EP | 1 296 094 | | 3/2003 | WO | WO 03/007049 | 1/2003 |
| EP | 1 306 609 | | 5/2003 | WO | WO 03/038509 | 5/2003 |
| EP | 1 329 664 A1 | | 7/2003 | WO | WO 03/056876 | 7/2003 |
| EP | 1 336 876 | | 8/2003 | WO | WO 03/062912 | 7/2003 |
| EP | 1 347 315 A1 | | 9/2003 | WO | WO 2004/003643 | 1/2004 |
| EP | 1 389 775 | | 2/2004 | WO | WO 2004/015489 A1 | 2/2004 |
| EP | 1 413 543 | | 4/2004 | WO | WO 2004/088372 | 10/2004 |
| EP | 1 437 610 | | 7/2004 | WO | WO 2004/114418 | 12/2004 |
| EP | 1 445 629 | | 8/2004 | WO | WO 2005/011012 | 2/2005 |
| EP | 1 519 218 | | 3/2005 | WO | WO 2005/076051 | 8/2005 |
| EP | 1 531 302 | | 5/2005 | WO | WO 2005/088367 | 9/2005 |
| EP | 1 544 537 | | 6/2005 | WO | WO 2005/093490 | 10/2005 |
| EP | 1577701 | A | 9/2005 | WO | WO 2005/111669 A1 | 11/2005 |
| EP | 1 640 764 | | 3/2006 | WO | WO 2006/008702 | 1/2006 |
| EP | 1 640 961 | | 3/2006 | WO | WO 2006/036451 | 4/2006 |
| EP | 1 698 918 | | 9/2006 | WO | WO 2006/036496 | 4/2006 |
| EP | 1 734 401 | | 12/2006 | WO | WO 2007/064133 | 6/2007 |
| EP | 1 748 305 A1 | | 1/2007 | WO | WO 2007/094558 A1 | 8/2007 |
| EP | 1 832 806 | | 9/2007 | WO | WO 2007/149474 | 12/2007 |
| EP | 1 870 635 | | 12/2007 | WO | WO 2008/027275 | 3/2008 |
| EP | 1 988 332 | | 11/2008 | WO | WO 2008/039229 | 4/2008 |
| EP | 1 988 333 | | 11/2008 | WO | WO 2008/045200 A2 | 4/2008 |
| EP | 2 068 180 | | 6/2009 | WO | WO 2008/045207 A2 | 4/2008 |
| EP | 2 068 181 | | 6/2009 | WO | WO 2008/045218 | 4/2008 |
| EP | 2 068 182 | | 6/2009 | WO | WO 2008/045222 | 4/2008 |
| GB | 2 260 203 | | 4/1993 | WO | WO 2008/045224 | 4/2008 |
| GB | 2 321 532 | | 7/1998 | WO | WO 2008/045310 | 4/2008 |
| GB | 2 336 933 | | 3/1999 | WO | WO 2008/045311 | 4/2008 |
| GB | 2 331 615 | | 5/1999 | WO | WO 2008/045312 | 4/2008 |
| GB | 2 340 281 | | 2/2000 | WO | WO 2008/045362 | 4/2008 |
| GB | 2 351 834 | | 1/2001 | WO | WO 2008/045363 | 4/2008 |
| JP | 60 242408 | | 12/1985 | WO | WO 2008/045364 | 4/2008 |
| JP | 09 160032 | | 6/1997 | WO | WO 2008/045462 | 4/2008 |
| JP | 09 311333 | | 12/1997 | WO | WO 2008/045463 | 4/2008 |
| JP | 11 211999 | | 8/1999 | WO | WO 2008/069877 | 6/2008 |
| JP | 11 231321 | | 8/1999 | WO | WO 2008/109620 | 9/2008 |
| JP | 11 232919 | | 8/1999 | WO | WO 2008/137299 | 11/2008 |
| JP | 2000 075293 | | 3/2000 | WO | WO 2008/145096 | 12/2008 |

| | | |
|---|---|---|
| WO | WO 2009/073555 | 6/2009 |
| WO | WO 2009/076075 | 6/2009 |

OTHER PUBLICATIONS

"International Search Report and Written Opinion, dated Mar. 5, 2008 in PCT Application No. PCT/US2007/020969".
International Preliminary Report on Patentability in PCT/US2007/020969; (International Publication No. WO 2008/045222), dated Dec. 23, 2008.
International Search Report and Written Opinion in PCT/US2007/020680 (International Publication WO 2008/045200), dated Jul. 1, 2008.
International Search Report and Written Opinion in PCT/US2007/020736 (International Publication No. WO 2008/045207), dated Jul. 14, 2008.
Written Opinion of the International Preliminary Examining Authority in PCT/US2007/020969 (International Publication No. WO 2008/045222), dated Sep. 29, 2008.
Petition dated Dec. 19, 2008 and Documents submitted therewith in U.S. Appl. No. 11/952,941.
Decision on the Petition granted Mar. 6, 2009 in U.S. Appl. No. 11/952,941.
Extended Search Report in European Patent Application No. 08153686.4 (Publication No. EP 2068180) dated Apr. 17, 2009.
International Search Report and Written Opinion in PCT/US2008/085026 (International Publication No. WO 2009/076075) dated Apr. 20, 2009.
Fan et al., "Channel Drop Filters in Photonic Crystals", Optics Express, vol. 3, No. 1, pp. 4-11, 1998.
Giles et al., "Silicon MEMS Optical Switch Attenuator and Its Use in Lightwave Subsystems", IEEE Journal of Selected Topics in Quantum Electronics, vol. 5. No. 1, pp. 18-25, Jan./Feb. 1999.
Little et al., "Vertically Coupled Microring Rosonator Channel Dropping Filter", IEEE Photonics Technology Letters, vol. 11, No. 2, pp. 215-217, 1999.
Magel, "Integrated Optic Devices Using Micromachined Metal Membranes", SPIE vol. 2686, 0-8194-2060-3, pp. 54-63, 1996.
Mehregany et al., "MEMS Applications in Optical Systems", IEEE/LEOS 1996 Summer Topical Meetings, pp. 75-76, Aug. 5-9, 1996.
Neal T.D., et. al., "Surface Plasmon enhanced emission from dye doped polymer layers," Optics Express Opt. Soc. America, USA, vol. 13, No. 14, pp. 5522-5527, Jul. 11, 2005.
Oliner, "Radiating Elements and Mutual Coupling," Microwave Scanning Antennas, vol. 2, pp. 131-157 and pp. 190-194, 1966.
Zhou et al., "Waveguide Panel Display Using Electromechanisl Spatial Modulators" SID Digest, vol. XXIX, 1998.
Austrian Search Report for U.S. Appl. No. 11/064,143 dated Aug. 12, 2005.
Extended Search Report in European Patent Application No. 05255638.8 (Publication No. 1 640 764) dated May 4, 2006.
European Search Report in European Patent Application No. 08153436.4 (Publication No. EP 1 988 332) dated Oct. 8, 2008.
European Search Report in European Patent Application No. 08153770.6 (Publication No. EP 1 988 333) dated Oct. 8, 2008.
Extended Search Report in European Patent Application No. 08153690.6 (Publication No. EP 2 068 181 ) dated Mar. 5, 2009.
Extended European Search Report in European Patent Application No. 08153691.4 (Publication No. EP 2068182) dated Mar. 25, 2009.
International Search Report and Written Opinion in PCT/US2005/006629(International Publication No. WO 2005/093490) dated Jun. 6, 2005.
International Search Report and Written Opinion in PCT/US2008/061046 (International Publication No. WO 2008/137299) dated Oct. 1, 2008.
International Search Report and Written Opinion in PCT/US2007/018639 (International Publication No. WO 2008/027275) dated Mar. 20, 2008.
International Search Report and Written Opinion in PCT/US2007/020911 (International Publication No. WO 2008/045218) dated Mar. 18, 2008.
Partial International Search Report in PCT/US2008/086875 dated Apr. 16, 2009.
International Search Report and Written Opinion in PCT/US2007/021459 (International Publication No. WO 2008/045363) dated May 14, 2008.
International Search Report and Written Opinion in PCT/US2007/021460 (International Publication No. WO 2008/045364) dated May 14, 2008.
International Search Report and Written Opinion in PCT/US2007/021375 (International Publication No. WO 2008/045310) dated May 14, 2008.
International Search Report and Written Opinion in PCT/US2007/021458 (International Publication No. WO 2008/045362) dated May 14, 2008.
International Search Report and Written Opinion in PCT/US2007/021378 dated Mar. 5, 2008 (International Publication No. WO 2008/045312).
International Search Report and Written Opinion in PCT/US2007/021376 dated Jun. 18, 2008 (International Publication No. WO 2008/045311).
International Search Report and Written Opinion in PCT/US2007/020999 dated Apr. 8, 2008 (International Publication No. WO 2008/045224).
International Search Report and Written Opinion in PCT/US2007/021623(International Publication No. WO 2008/045463) dated Oct. 22, 2008.
International Search Report and Written Opinion in PCT/US2007/021622(International Publication No. WO 2008/045462) dated Oct. 22, 2008.
International Search Report and Written Opinion in PCT/US2008/085010 (International Pub. No. WO 2009/073555 ) dated Mar. 4, 2009.
Written Opinion for International Application No. PCT/US 07/04277 (International Publication No. WO 2008/039229) dated Apr. 3, 2008.
International Search Report and Written Opinion in PCT/US2007/014358 (International Publication No. WO 2007/149474) dated Dec. 13, 2007.
Partial International Search Report and Written Opinion in PCT/US2009/033698 dated May 29, 2009.
Partial International Search Report in International App. No. PCT/US2009/033597 dated May 19, 2009.
Extended Search Report in European Application No. 08152870.5 dated Mar. 3, 2010.
Office Action in European Application No. 07838811.3 dated Mar. 2, 2010.
Neal T. D., et. al., "Surface Plasmon enhanced emission from dye doped polymer layers," Optics Express Opt. Soc. America, USA, vol. 13, No. 14, pp. 5522-5527, Jul. 11, 2005.
International Preliminary Report on Patentability in Application No. PCT/US2007/020736 (Publication No. WO 2008/045207), dated Dec. 30, 2008.
International Preliminary Report on Patentability in Application No. PCT/US2007/020680 (Publication No. WO2008/045200), dated Apr. 16, 2009.
Extended European Serach Report in Application No. 08152870 (Publication No. EP2141408) dated Mar. 3, 2010.
Official Communication in European Application No. 07 838 811.3 (Publication No. EP1943555) dated Mar. 19, 2009.
Preliminary Amendment in U.S. Appl. No. 12/444,138 dated Jan. 11, 2010.
Preliminary Amendment in U.S. Appl. No. 12/444,142 dated Apr. 4, 2009.
Official Communication in U.S. Appl. No. 11/699,074 (Publication No. US2008-0180956A1) dated Mar. 9, 2008.
Response to Official Communication in U.S. Appl. No. 11/699,074 (Publication No. US2008-0180956A1) dated Jun. 11, 2008.
Notice of Allowance in U.S. Appl. No. 11/699,074 (Publication No. US2008-0180956A1) dated Jul. 11, 2008.
Request for Continued Examination (RCE), Amendment, Information Disclosure Statement (IDS), and Drawings in U.S. Appl. No. 11/699,074 (Publication No. US2008-0180956A1) dated Oct. 10, 2008.
Notice of Allowance in U.S. Appl. No. 11/699,074 (Publication No. US2008-0180956A1) dated Oct. 31, 2008.

Request for Continued Examination (RCE) and Information Disclosure Statement (IDS) in U.S. Appl. No. 11/699,074 (Publication No. US2008-0180956A1) dated Jan. 30, 2009.

Notice of Allowance in U.S. Appl. No. 11/699.074 (Publication No. US2008-0180956A1) dated Feb. 26, 2009.

Request for Continued Examination (RCE) and Information Disclosure Statement (IDS) in U.S. Appl. No. 11/699,074 (Publication No. US2008-0180956A1) dated May 22, 2009.

Notice of Allowance in U.S. Appl. No. 11/699,074 (Publication No. US2008-0180956A1) dated Jun. 26, 2009.

Post-Allowance Communication in U.S. Appl. No. 11/699,074 (Publication No. 2008-0180956A1) dated Sep. 25, 2009.

Issue Notification in U.S. Appl. No. 11/699,074 (Publication No. US2008-0180956A1) dated Oct. 28, 2009.

Request for Continued Examination (RCE), Information Disclosure Statement (IDS), and Petition to Withdraw in U.S. Appl. No. 11/699,074 (Publication No. US2008-0180956A1) dated Nov. 11, 2009.

Petition Decision in U.S. Appl. No. 11/699,074 (Publication No. US2008-0180956A1) dated Nov. 17, 2009.

Supplemental Amendment in U.S. Appl. No. 11/699,074 (Publication No. US2008-0180956A1) dated Nov. 24, 2009.

Notice of Allowance in U.S. Appl. No. 11/699,074 (Publication No. US2008-0180956A1) dated Dec. 3, 2009.

Request for Continued Examination, Amendment, and Information Disclosure Statement in U.S. Appl. No. 11/699,074, dated Mar. 11, 2010.

Notice of Allowance in U.S. Appl. No. 11/699,074, dated Mar. 3, 2010.

Comments on Statement of Reasons for Allowance in U.S. Appl. No. 11/699,074, dated Jun. 11, 2010.

Official Communication in European Application No. 07 838 811, dated Mar. 2, 2010.

Preliminary Amendment in U.S. Appl. No. 11/952,941, dated Dec. 14, 2009.

Official Communication in European Application No. 08153686, dated Jan. 19, 2010.

International Preliminary Report on Patentability in PCT/US2008/085026 (International Pub. No. WO 2009/076075) dated Apr. 12, 2010.

US 7,619,822, 11/2009, Gruhike (withdrawn)

* cited by examiner

INTERNAL OPTICAL ISOLATION STRUCTURE FOR INTEGRATED FRONT OR BACK LIGHTING

FIELD OF THE INVENTION

Microelectromechanical systems (MEMS) include micromechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF THE INVENTION

One embodiment disclosed herein includes a display with integrated front or back light guide that has a plurality of display elements, an optical isolation structure disposed over the display elements, wherein the optical isolation structure comprises at least one non-gaseous material layer, and a transparent substrate disposed over the optical isolation structure, wherein the material layers has an index of refraction less than the index of refraction of the transparent substrate.

Another embodiment disclosed herein includes a display with integrated front or back light guide that has a plurality of display elements, an optical isolation structure disposed over the display elements, wherein the optical isolation structure comprises one or more dielectric layers, and a transparent substrate disposed over the optical isolation structure.

Another embodiment disclosed herein includes a display that has a plurality of display elements and one or more interference layers disposed over the display elements, wherein the interference layers are adapted to reflect more than 40% of light incident on the layers at angles greater than 70 degrees relative to normal to the layers.

Another embodiment disclosed herein includes a light guide that has a transparent substrate and a plurality of material layers disposed on the transparent substrate, wherein at least one of the material layers has an index of refraction greater than the index of refraction of the transparent substrate and wherein at least one of the material layers has an index of refraction less than the index of refraction of the transparent substrate, wherein the combined plurality of material layers is adapted to reflect more than 40% of light incident on the plurality of material layers within the substrate at angles greater than 70 degrees relative to normal to the plurality of material layers.

Another embodiment disclosed herein includes a display that has a means for displaying image content, means disposed over the displaying means for reflecting light, and means disposed over the reflecting means for transmitting light.

Another embodiment disclosed herein includes a method of manufacturing a display by depositing one or more material layers on a first side of a transparent substrate, wherein at least one of said material layers has an index of refraction less than the index of refraction of the transparent substrate, and wherein the combined one or more material layers are adapted to reflect more than 40% of light incident on the layers from within the substrate at angles greater than 70 degrees relative to normal to the layers and forming a plurality of display elements on the material layers.

Another embodiment disclosed herein includes a method of illuminating a display that includes transmitting light into an edge of a transparent substrate such that the light reflects at least once off an optical isolation structure comprising one or more non-gaseous material layers on the substrate and redirecting the light to pass through the substrate and optical isolation structure into a display element without the light passing through air.

DETAILED DESCRIPTION OF THE PREFERRED EMBODIMENT

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Some display applications require lighting for all conditions, for example transmissive displays. In other display applications, for example reflective or transflective displays, it is necessary to provide supplemental illumination of the display, particularly in dark ambient conditions. Accordingly, in some embodiments, illumination (whether supplemental or full-time) is provided by an integrated front or back light, utilizing the transparent substrate of the display elements as a light guide. Use of the substrate as a light guide is facilitated by incorporation of an optical isolation structure between the substrate and the display elements. The optical isolation structure has the properties of reflecting a substantial portion of light within the substrate that impact the optical isolation structure at high angles relative to normal to the optical isolation structure. This high angle reflection maintains the light within the substrate until the light rays encounter light redirectors that redirect the light into the display elements. Thus, light entering the substrate from a source on the edge of the substrate can distribute over substantially all of the display area before being redirected into the display elements to illuminate the display.

Figure 1:
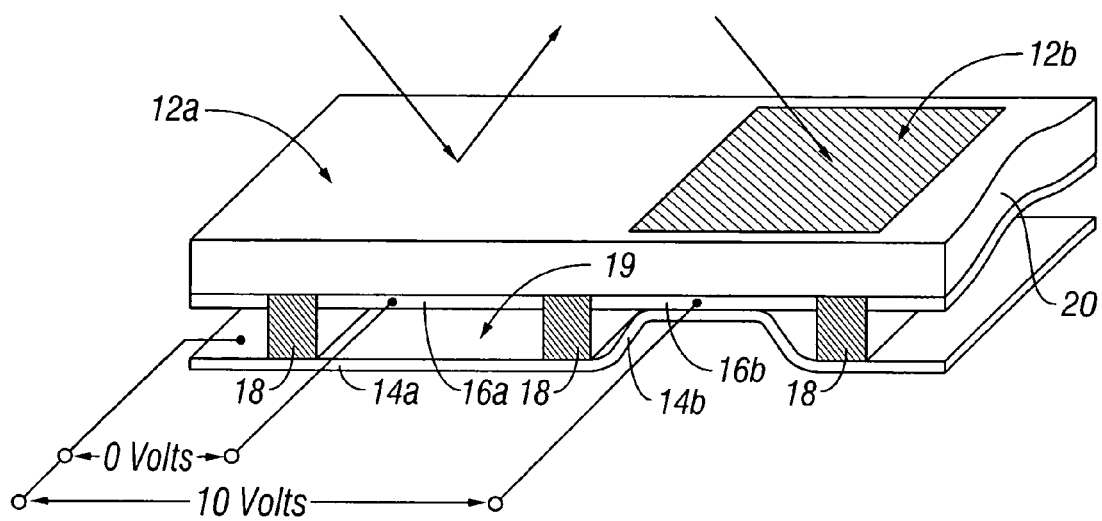
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
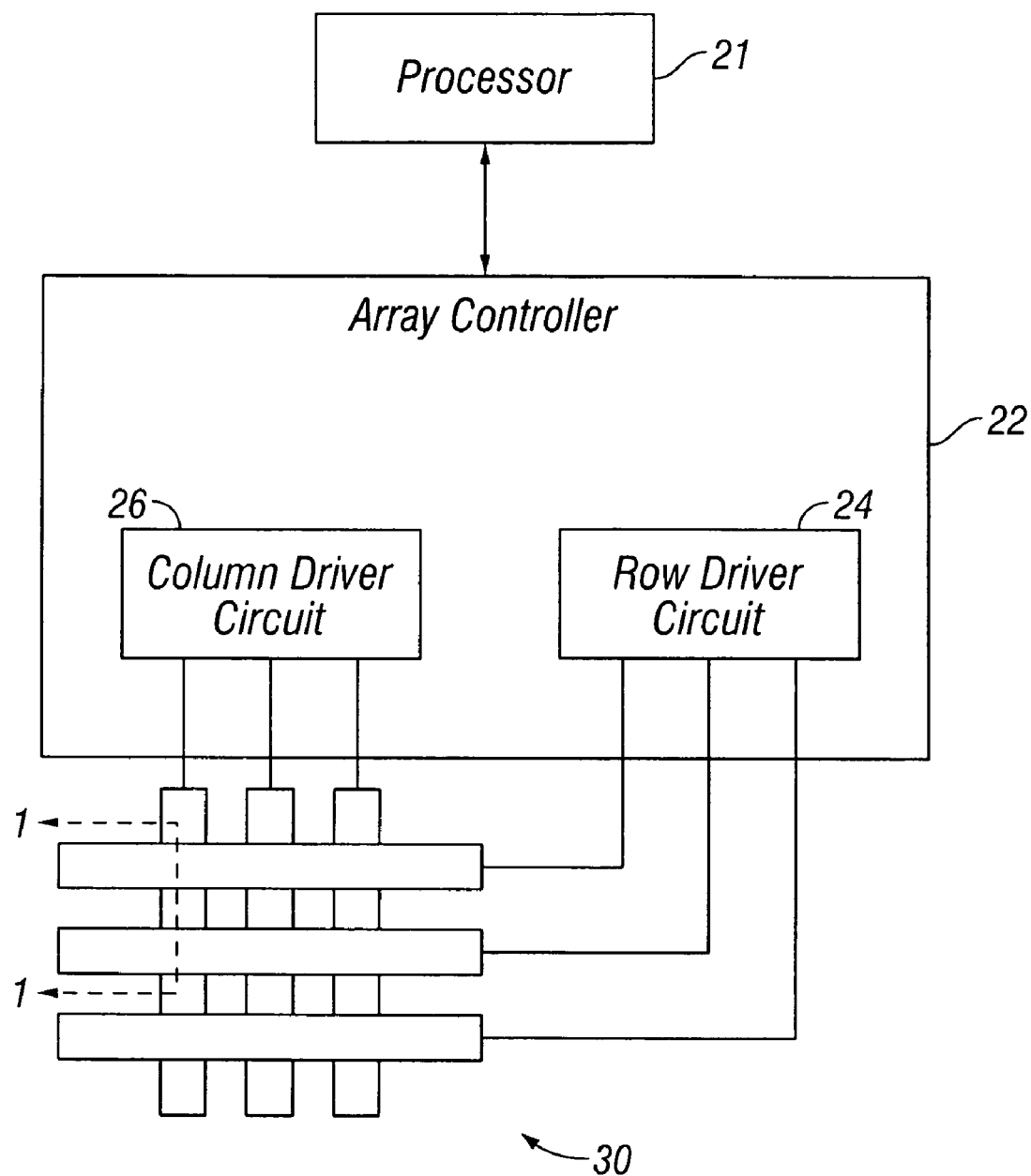
FIG. 2 is a system block diagram illustrating one embodiment of an electronic device incorporating 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
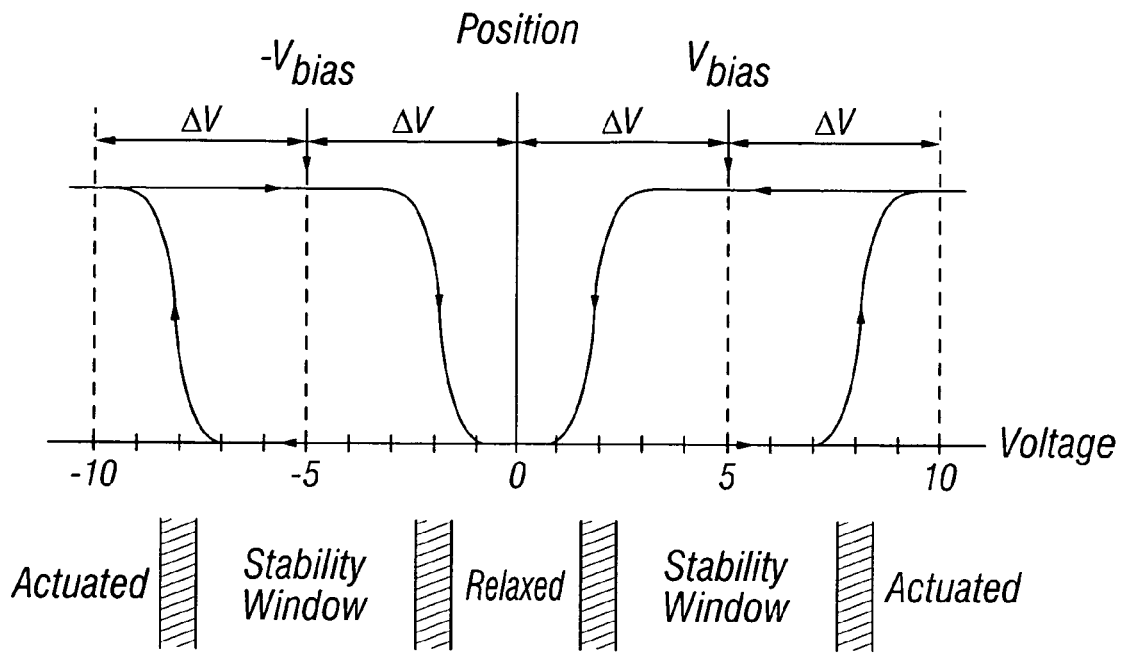
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
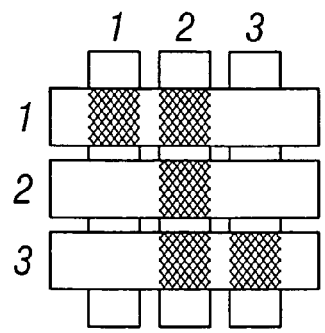
FIGS. 5A and 5B illustrate one exemplary timing diagram for row and column signals that may be used to write a frame of display data to the 3×3 interferometric modulator display of FIG. 2.
Figure 5B:
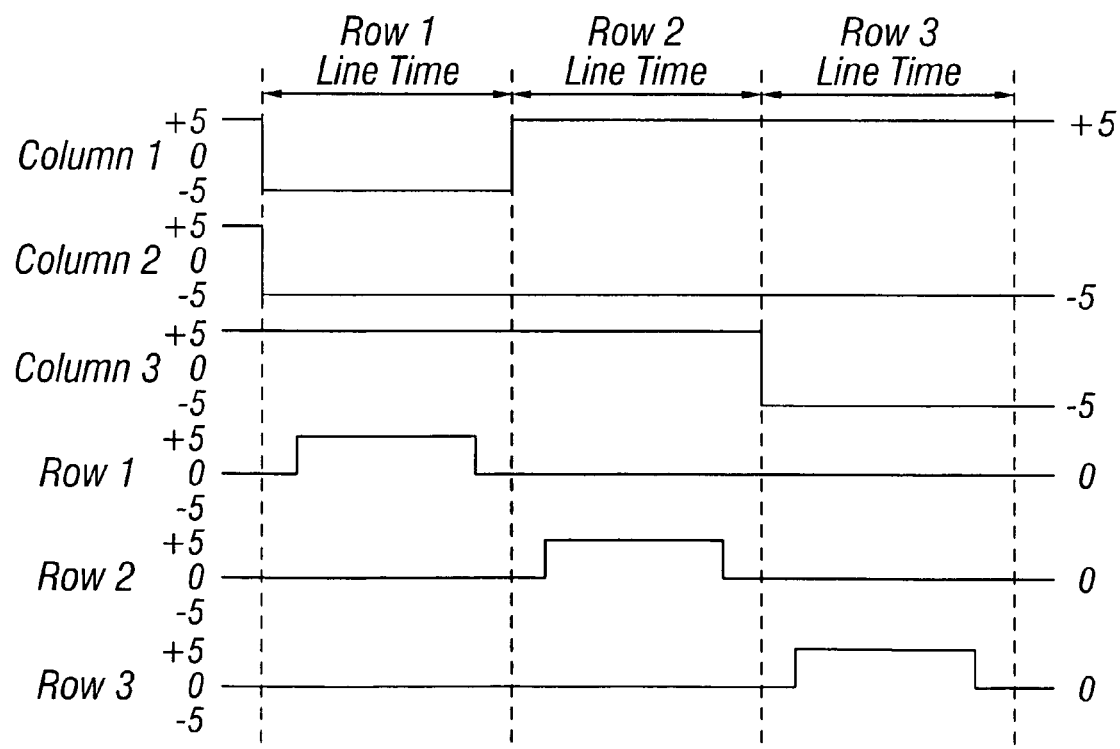

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
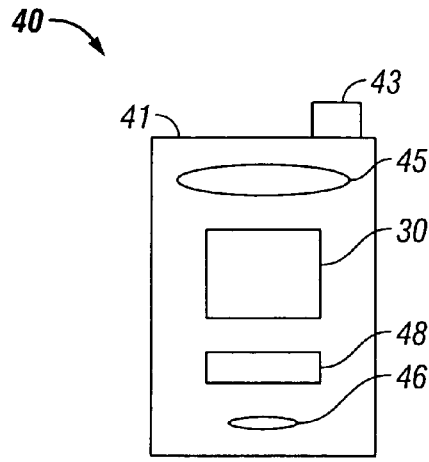
FIGS. 6A and 6B are system block diagrams illustrating an embodiment of a visual display device comprising a plurality of interferometric modulators.
Figure 6B:
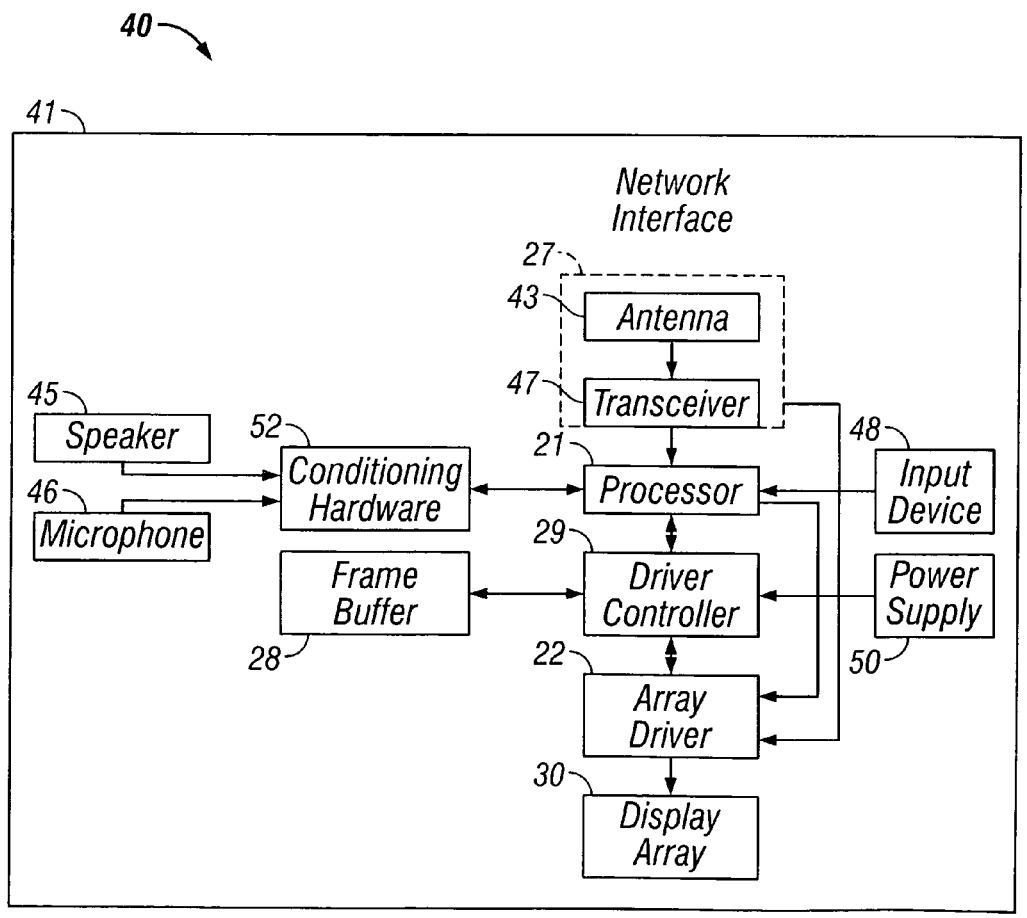

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
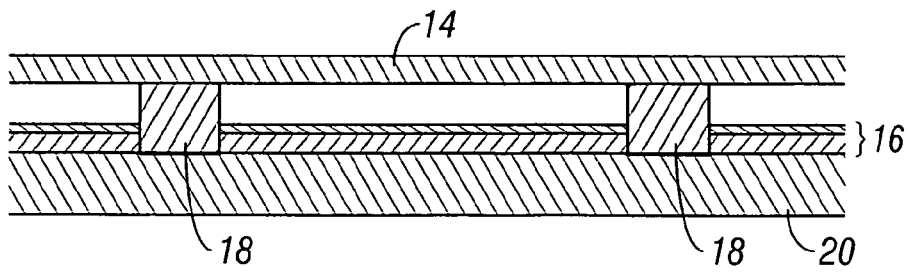
FIG. 7A is a cross section of the device of FIG. 1.
Figure 7B:
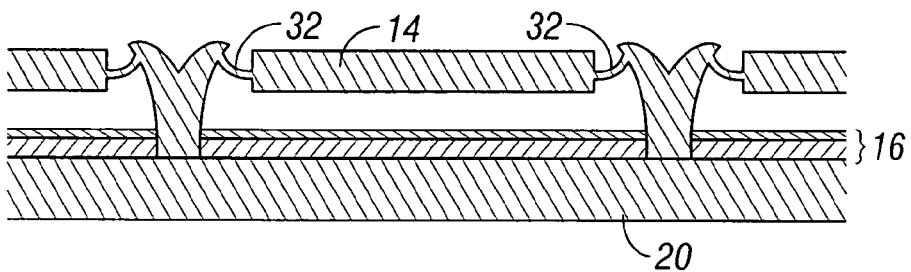
FIG. 7B is a cross section of an alternative embodiment of an interferometric modulator.
Figure 7C:
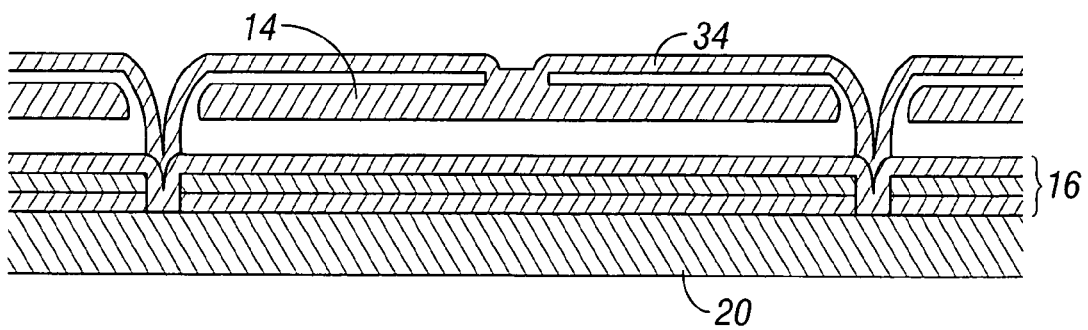
FIG. 7C is a cross section of another alternative embodiment of an interferometric modulator.
Figure 7D:
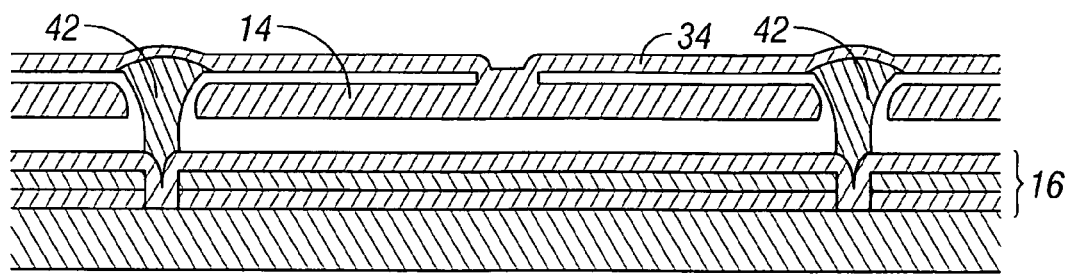
FIG. 7D is a cross section of yet another alternative embodiment of an interferometric modulator.
Figure 7E:
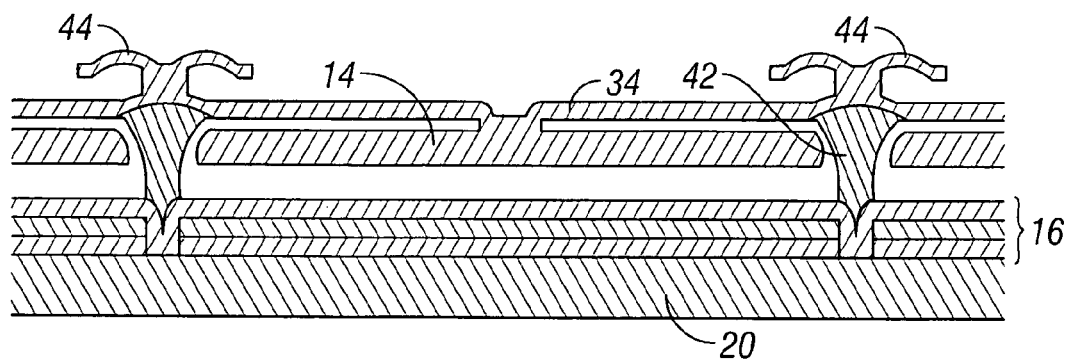
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

In uses where an interferometric modulator display is operated in low ambient light, it may be desirable to provide supplemental lighting. In some embodiments, a supplemental light source can be incorporated into the display. In some such embodiments, the supplemental lighting is provided by using the substrate (e.g., substrate 20 in FIGS. 7A-7E) as a light guide. In such a configuration, the supplemental lighting is integrated within the display panel itself as opposed to providing a separate front light or back light. A typical display light guide (e.g., as used in a front light or back light) comprises a planar sheet of glass, which is used with an air gap between the glass and the display. The air gap provides for total internal reflection at the air-glass interface for light rays within the glass having high angles of incidence relative to normal to the sheet of glass (a high angle is at or above the critical angle necessary for reflection of 100% of the incident light, according to Snell's law). Because there is no air gap between the substrate and the immediately adjacent display elements in interferometric modulator displays, using the substrate as a light guide suffers from the drawback of reduced reflectivity for high-angle light rays at the substrate-display element interface. Such reduced reflectivity results in lower illumination of the display and reduced color and brightness uniformity. Accordingly, in some embodiments, an optical isolation structure is introduced in between the substrate and the display elements in order to increase the reflectivity of high-angle light rays within the substrate at the substrate-optical isolation structure interface.

In various embodiments, the optical isolation structure in between the substrate and the display elements is adapted to reflect more than about 20%, about 25%, about 30%, about 35%, about 40%, about 45%, about 50%, about 55%, about 60%, about 65%, about 70%, about 75%, about 80%, about 85%, about 90%, about 95% or higher of light incident on the optical isolation structure from within the substrate at angles greater than about 50 degrees, about 55 degrees, about 60 degrees, about 65 degrees, about 70 degrees, about 75 degrees, about 80 degrees, or about 85 degrees relative to normal to the optical isolation structure.

In some embodiments, in addition to providing relatively high reflectivity for high-angle light rays, the optical isolation structure is adapted to provide high transmittance of low-angle light rays. Such high transmittance permits light within the substrate to be redirected into the display elements as well as permitting light reflected from the display elements or ambient light to pass freely through the optical isolation structure. In some embodiments, the optical isolation structure is adapted to transmit more than about 60%, about 65%, about 70%, about 75%, about 80%, about 85%, about 90%, or about 95% of light incident on the structure at angles less than about 15 degrees, about 20 degrees, about 25 degrees, about 30 degrees, about 35 degrees, or about 40 degrees relative to normal to the structure.

Figure 8:
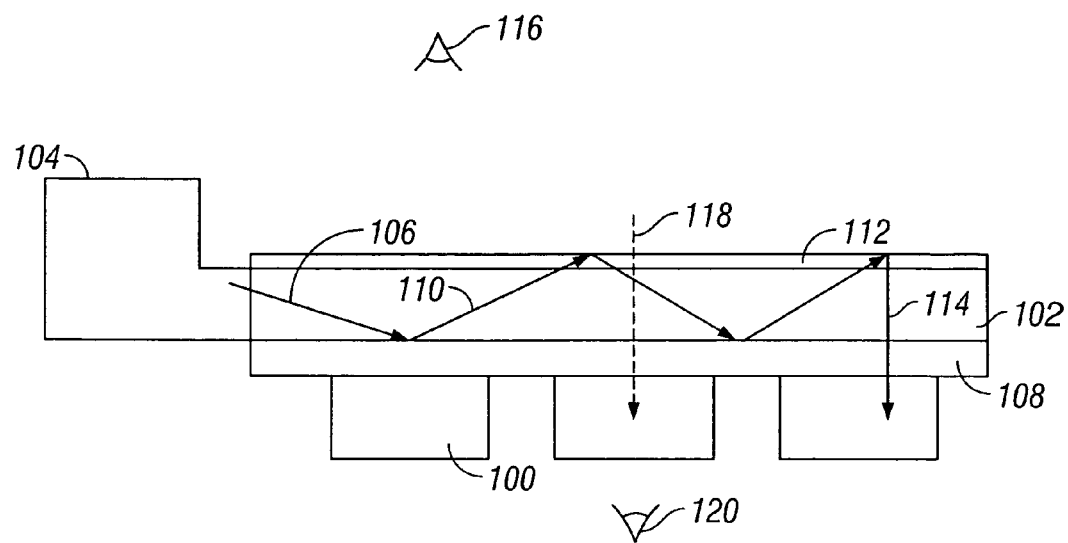
FIG. 8 is a cross section of a display having an integrated front or back light.

FIG. 8 is a cross-sectional view of one embodiment of a display utilizing an integrated front light. In addition to supporting the display elements 100, the substrate 102 acts as a light guide to provide integrated front lighting. A light source 104 may be positioned on an edge of the substrate 102 for directing light rays 106 into the substrate 102 at high angles relative to normal to the substrate 102. The light source 104 may be any suitable light source known in the art. Non-limiting examples include LEDs or fluorescent lights such as-Cold Compact Fluorescent Lights. As discussed above, an optical isolation structure 108 may be positioned between the substrate 102 and the display elements 100. The optical isolation structure 108 causes a substantial portion of the high-angle light rays 106 from the light source 104 to be reflected from the optical isolation structure 108 back into the substrate 102. The reflected light rays 110 proceed through the substrate 102 until they encounter an interface with air from which they are reflected due to total internal reflection. Reflection between the optical isolation structure 108 and the upper air interface keeps the light within the substrate 102.

The display may additionally include light redirectors to redirect certain of the light rays 110 into the display elements 100. The light redirectors may be incorporated within a film 112 positioned on the side of the substrate 102 opposite the optical isolation structure 108. The film 112 may be constructed of a material having substantially the same index of refraction as the substrate 102. Thus, light rays 110 may proceed between the substrate 102 and the film 112 without substantial reflection from the film 112-substrate 102 interface. Light rays 110 reflected from the optical isolation structure 108 may proceed through the substrate 102 and through the film 112 until they either encounter a light redirector or the air interface with the film 112 from which they are reflected due to total internal reflection. Once a light ray 110 encounters a light redirector, the light is reflected at an angle such that the reflected light ray 114 is directed into a display element 100. The light redirectors may be configured to redirect light having angles greater than about 50, about 60, about 70, or about 80 degrees relative to normal to the substrate 102 into the display elements 100.

As discussed above, the optical isolation structure 108 may be adapted to transmit a substantial portion of light rays having low angles relative to normal to the structure 108. Thus, light 114 redirected from the light redirectors can pass freely through the optical isolation structure 108 and into the display elements 100. Furthermore, light reflected back from the display elements can pass freely through the optical isolation structure 108, substrate 102, and film 112 to a viewer 116. In addition, ambient light rays 118 can pass freely through the film 112, substrate 102, and optical isolation structure 108 to contribute to the illumination of the display.

Although the integrated front light has been described above for use with reflective interferometric modulator display elements, it will be appreciated that the front light may also be used with other reflective display technologies such as reflective or transflective LCD elements. In addition, the same integrated lighting scheme may be used to create an integrated back light for use with transmissive display technologies (e.g., transmissive or transflective LCDs). For example, in back lighting implementations, the display elements 100 may be transmissive display elements such that light 114 redirected into the display elements continue through the elements to a viewer 120.

Figure 9:
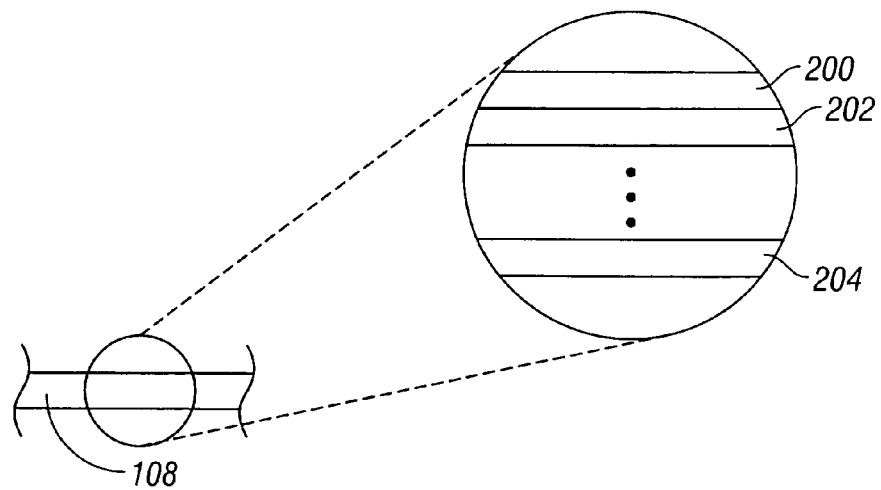
FIG. 9 is a cross section of an optical isolation structure consisting of a plurality of material layers.

Optical isolation structures 108 having the desired characteristics of high angle reflection and low angle transmission may include a variety of structures. In one embodiment, the optical isolation structure 108 comprises of a single layer of material (e.g., a dielectric material) having an index of refraction less than the index of refraction of the substrate 102 and a thickness of at least a few wavelengths (i.e., cladding). The difference in indices of refraction between the substrate 102 and the optical isolation structure 108 (cladding) causes high-angle light rays to be totally internally reflected from this interface. In this embodiment, the high angle may be at or above the critical angle necessary for reflection of 100% of the incident light, according to Snell's law. Light at lower angles is partly reflected and partly refracted. In other embodiments, depicted in cross section in FIG. 9, the optical isolation structure 108 includes a plurality of material layers (e.g., material layers 200, 202, and 204). The plurality of material layers may include interference layers that utilize the properties of thin-film interference to obtain the desired reflection characteristics. For example, the layers 200, 202, and 204 may include sub-wavelength thin films of various dielectric materials. In one embodiment, optical isolation structure 108 may include films having varying indices of refraction. In one such embodiment, films are provided that alternate between indices of refraction higher than the substrate 102 and lower than the substrate 102. For example, the optical isolation structure 108 may include two film layers 200 and 202, one having an index of refraction higher than the substrate 102 and one having an index of refraction lower than the substrate 102. In other examples, the optical isolation structure 108 may include three film layers 200, 202, and 204 where layers 200 and 204 have indices of refraction higher than the substrate 102 and layer 202 has an index of refraction lower than the substrate 102. In still other examples, any number of additional thin film layers (e.g., between films 202 and 204) may be included to obtain the desired reflection properties through thin-film interference. Suitable dielectric materials for use in the optical isolation structure 108 include, but are not limited to, $Ta_2O_5$, $Na_3AlF_6$, $Al_2O_3$, $TiO_2$, $SiO_2$, SiO, $SiN_x$, and $MgF_2$.

Figure 10:
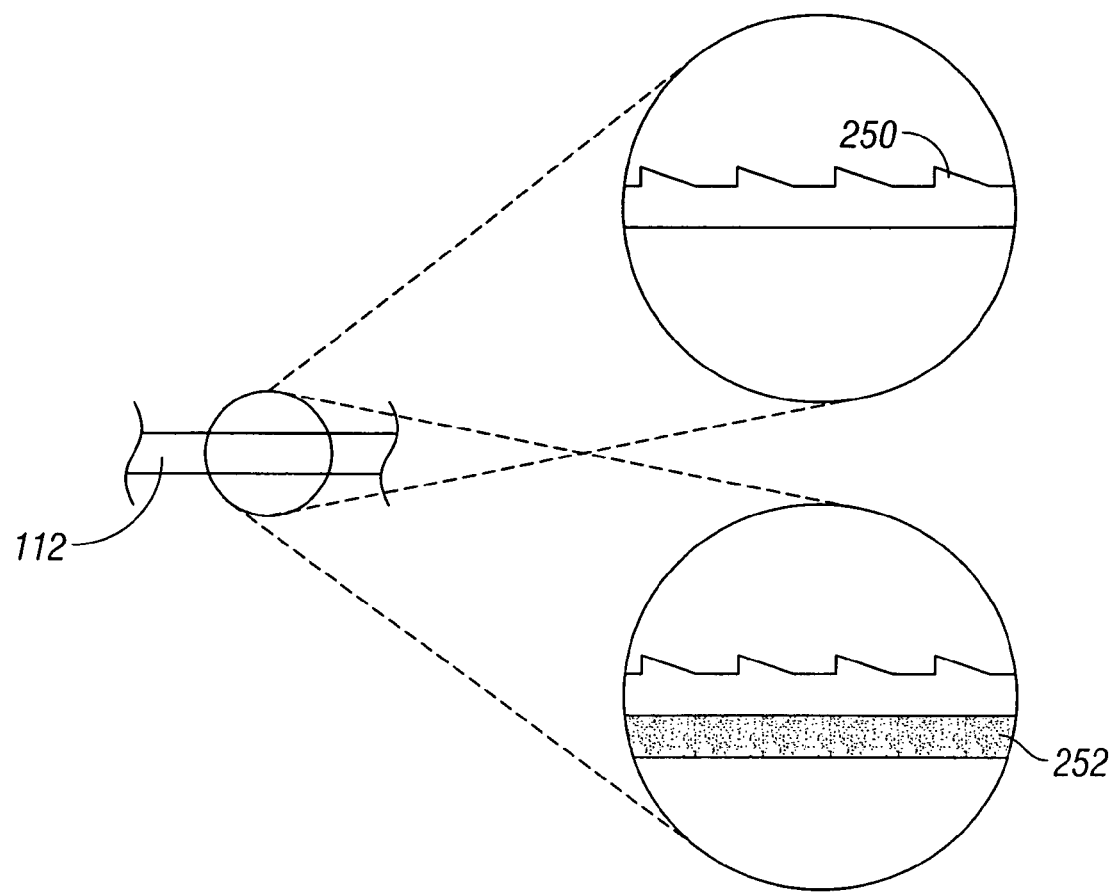
FIG. 10 is a cross section of two embodiments of a film containing light redirectors.

Any suitable light redirector may be incorporated into the film 112 to redirect light into the display elements 100. FIG. 10 is a cross section depicting two exemplary light redirectors in film 112. In the first example, the film 112 contains prismatic structures 250 having angled surfaces to change the angle of reflection of light reflecting off of the film 112-air interface. In some embodiments, the prismatic structures 250 are angled surfaces of the film 112 itself such that the light redirectors are integral with the film. Such prismatic structures 250 may be formed by injection molding or embossing of the film. In the second example, an intermediate layer including scattering centers 252 distributed within the layer is positioned between the light redirector film and the substrate. In one embodiment, the scattering centers 252 comprise particles, such as dielectric particles with index of refraction different from the base matrix of the said layer. Those of skill in the art will appreciate numerous other suitable light redirectors that may be utilized.

Because the optical isolation structure 108 is integrated within the display, it may be formed during manufacture of the display elements 100. For example, in manufacturing an interferometric modulator display, the optical isolation structure 108 may be deposited onto the substrate 102 as a first step of the manufacturing. The deposition may be by any suitable deposition technique, including but not limited to chemical vapor deposition and/or physical vapor deposition. In embodiments where the optical isolation structure 108 comprises of multiple layers of material (e.g., layers 200, 202, and 204 in FIG. 9), each layer may be sequentially deposited. After formation of the optical isolation structure 108, the typical deposition and patterning steps used to form the interferometric modulator display elements 100 may be performed on top of the optical isolation structure 108. Upon completion of the display element 100 manufacturing, the film 112 containing the light redirectors may be attached to the opposite side of the substrate 102. The film 112 may be attached to the substrate 102 by lamination, spin coating, or any other suitable method.

EXAMPLES

Example 1

Reflectivity of Optical Isolation Structure on Glass

Figure 11:
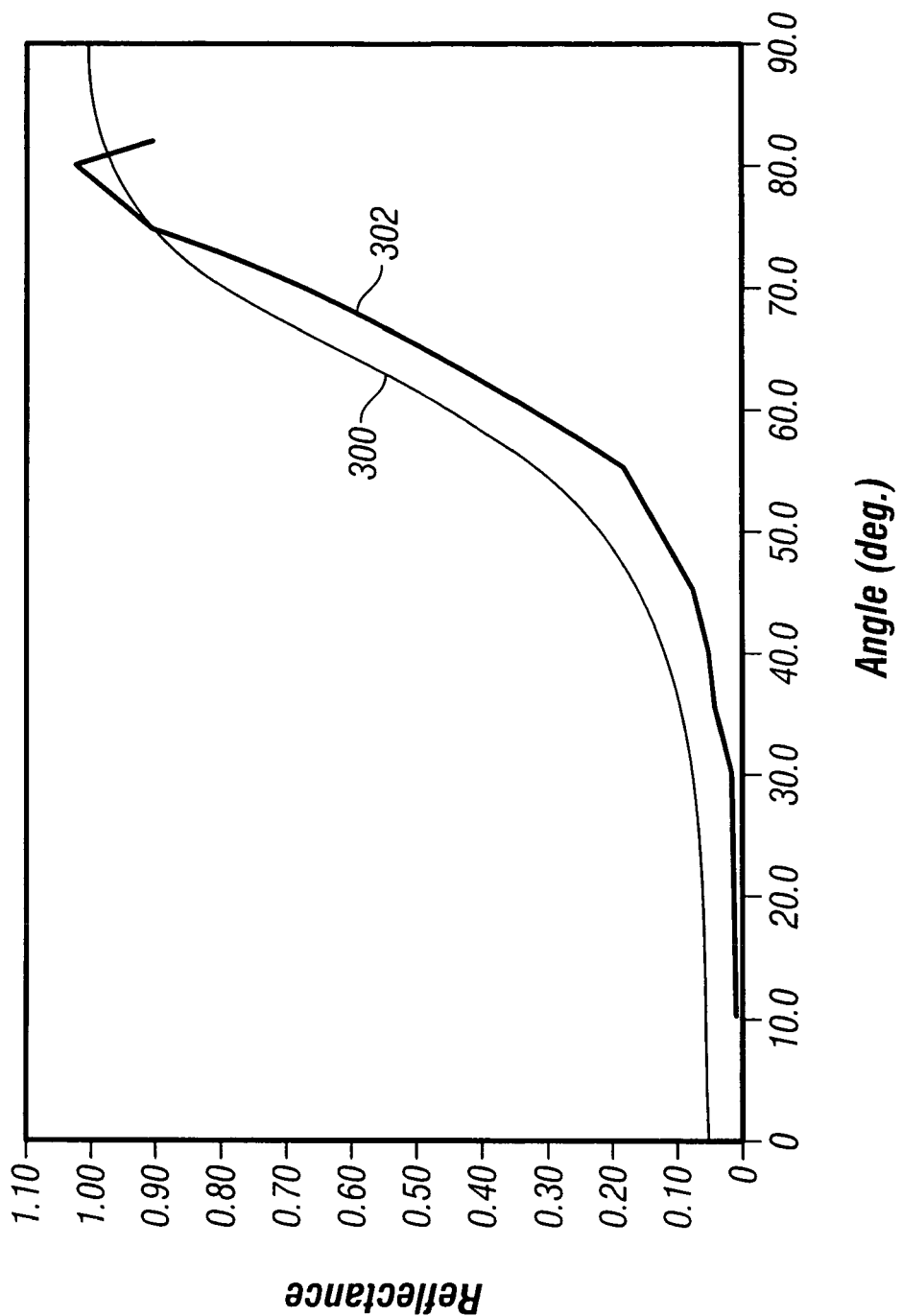
FIG. 11 is a graph depicting reflectance as a function of light incidence angle on an optical isolation structure.

An optical isolation structure consisting of three interference layers was deposited onto a glass substrate. First, a 100 nm thick layer of $TiO_2$ was deposited onto the glass substrate. Next, a 163 nm thick layer of $MgF_2$ was deposited onto the $TiO_2$ layer. Then a 138 nm thick layer of $TiO_2$ was deposited onto the $MgF_2$ layer. Finally, a layer of glass was optically coupled onto the final $TiO_2$ layer with an index matching fluid. The predicted reflectance as a function of light incidence angle was determined using a thin-film interference optical model. Actual reflectance values as a function of incidence angle were measured using a directed light source and a photodetector. FIG. 11 is a graph depicting the modeled 300 and measured 302 reflectance as a function of light incidence angle. The experimentally measured reflectance correlated closely with the modeled reflectance. The results indicate that the optical isolation structure provides the desired high reflectance for high-angle light rays (e.g., reflectance greater than 60% for angles above 70 degrees) as well as low reflectance for low angle light rays (e.g., reflectance less than 10% for angles below 40 degrees).

Example 2

Optical Modeling of Optical Isolation Structure in an Interferometric Modulator Display Reflectance as a function of light incidence angle from an interferometric modulator display containing an optical isolation structure was modeled using optical modeling software and compared to the same optical model lacking the optical isolation structure. The components included in the optical model with the optical isolation structure present are indicated in Table 1. The optical isolation structure consisted of the $Ta_2O_5$—$Na_3AlF_6$—$Ta_2O_5$ three-layer structure. The remaining layers make up the interferometric modulator operational layers with the MoCr partially reflective layer and the Al reflective layer making up a Fabry-Perot interferometer. The same components minus the $Ta_2O_5$—$Na_3AlF_6$—$Ta_2O_5$ three-layer structure were used to model an interferometric modulator without the optical isolation structure. The 210 nm air thickness was used to model the unactuated state (e.g., bright state) of the interferometric modulator. In an actuated state (e.g., dark state), the Al reflective layer collapses against the $Al_2O_3$ layer. Accordingly, the dark state was modeled by eliminating the 210 nm air gap.

TABLE 1

Interferometric modulator design with integrated optical isolation structure.

| Material | Refractive Index | Extinction Coefficient | Thickness (nm) |
|---|---|---|---|
| Glass substrate | 1.5109 | 0 | incoming medium |
| $Ta_2O_5$ | 2.1182 | 0 | 117 |
| $Na_3AlF_6$ | 1.35 | 0 | 167 |
| $Ta_2O_5$ | 2.1182 | 0 | 117 |

TABLE 1-continued

Interferometric modulator design with integrated optical isolation structure.

| Material | Refractive Index | Extinction Coefficient | Thickness (nm) |
|---|---|---|---|
| ITO | 1.6678 | 0.045355 | 42 |
| MoCr | 4.0109 | 3.93266 | 7 |
| $SiO_2$ | 1.4621 | 0 | 50 |
| $Al_2O_3$ | 1.665 | 0 | 4 |
| Air | 1 | 0 | 210 |
| Al | 1.99 | 7.05 | >30 |

Figure 12A:
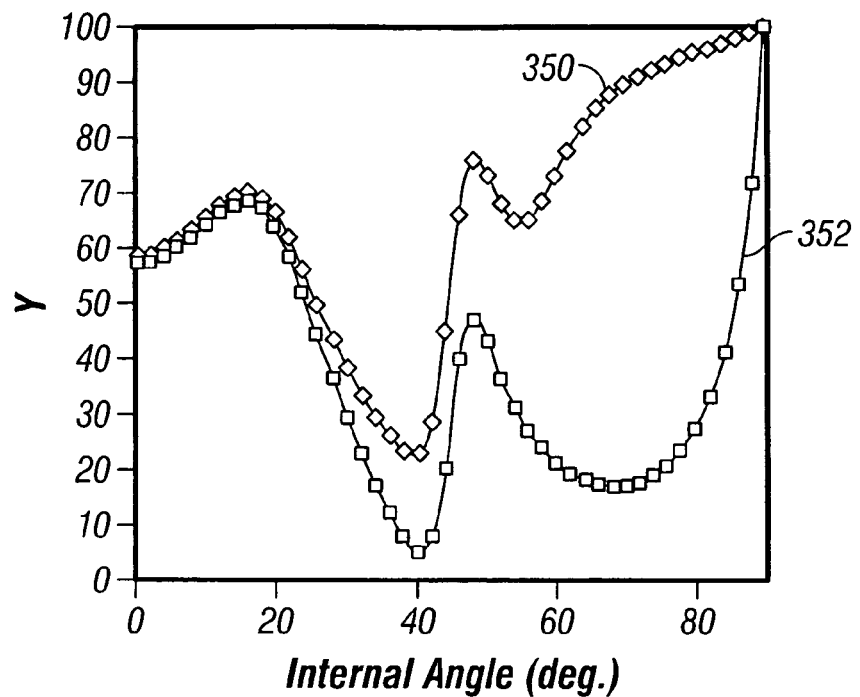
FIGS. 12A and 12B are graphs depicting reflectance as a function of light incidence angle on an interferometric modulator display with and without an optical isolation structure for the interferometric modulators in a bright state (FIG. 12A) and a dark state (FIG. 12B).
Figure 12B:
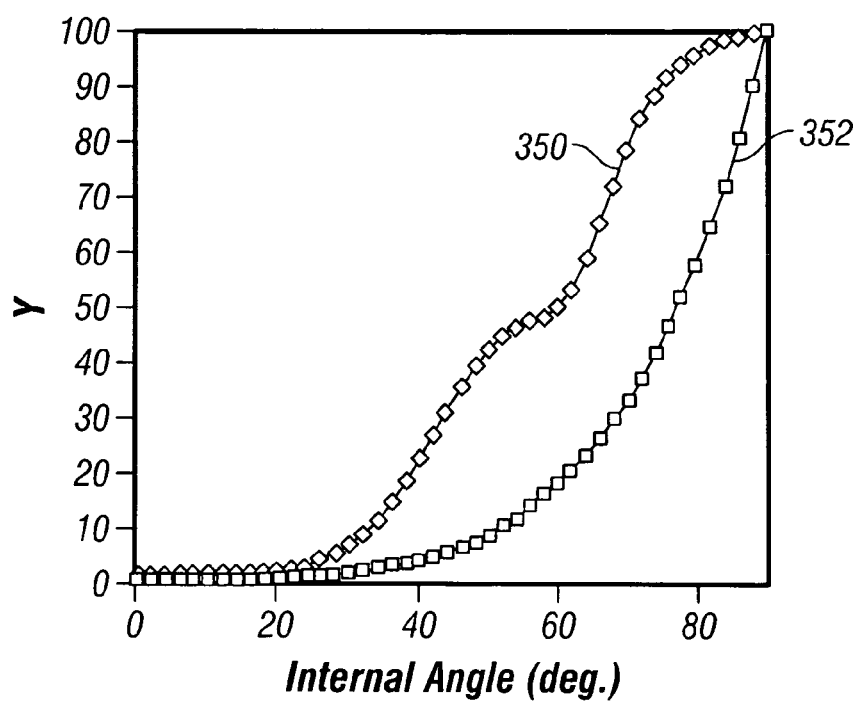

FIGS. 12A and 12B depict graphs of the modeled reflectance for the bright and dark states respectively. The reflectance values are plotted as Y color parameter values, which are indicative of perceived brightness. The graphs compare the results for the model including the optical isolation structure 350 and the model not including the optical isolation structure 352. The results indicate that for high angle of light incidence (which would be the case for an edge light source such as depicted in FIG. 8), a display including the optical isolation structure would have a substantially higher perceived brightness than a display not including the optical isolation structure.

Example 3

Reflectance from Static Interferometric Modulator with Integrated Optical Isolation Structure To verify the optical modeling results, a static interferometric modulator was constructed having the layers indicated in Table 2. The optical isolation structure consisted of the $TiO_2$—$MgF_2$—$TiO_2$ three-layer structure. The 193 nm $SiO_2$ layer replaces the air gap in a modulating interferometric modulator and provides an optical response similar to an unactuated bright state interferometric modulator.

TABLE 2

Static interferometric modulator design with integrated optical isolation structure.

| Material | Thickness (nm) |
|---|---|
| Glass substrate | incoming medium |
| $TiO_2$ | 110 |
| $MgF_2$ | 163 |
| $TiO_2$ | 153 |
| Cr | 7 |
| $SiO_2$ | 193 |
| Al | >30 |

Figure 13:
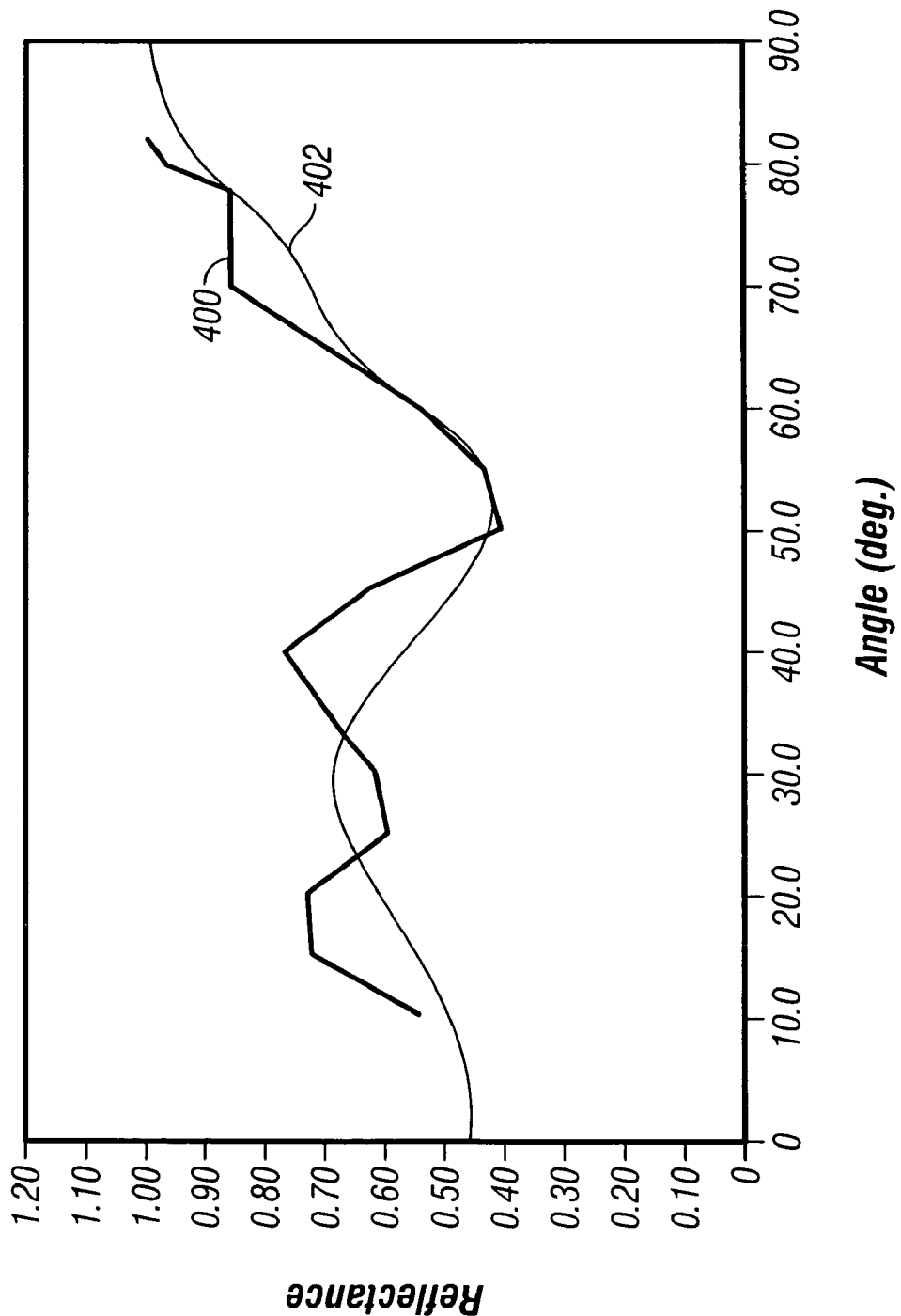
FIG. 13 is a graph depicting reflectance as a function of light incidence angle on a static interferometric modulator display in a bright state.

FIG. 13 is a graph depicting the experimentally measured reflectance as a function of incidence angle 400 compared to the computational results from an optical model of reflectance 402. The results indicate close agreement between the experimentally measured and modeled reflectance, confirming a high level of reflectance at high angles of light incidence.

Although the invention has been described with reference to embodiments and examples, it should be understood that numerous and various modifications can be made without departing from the spirit of the invention. Accordingly, the invention is limited only by the following claims.

What is claimed is:

1. A display with integrated front or back light guide, comprising:
   a plurality of display elements;
   an optical isolation structure disposed over the display elements, wherein the optical isolation structure comprises at least a first, second, and third non-gaseous material layer; and
   a transparent substrate disposed over the optical isolation structure, wherein the first material layer has an index of refraction greater than the index of refraction of the transparent substrate, the second material layer has an index of refraction less than the index of refraction of the first material layer, and the third material layer has an index of refraction greater than the index of refraction of the second material layer, and wherein the optical isolation structure is adapted to reflect more light incident on the optical isolation structure from within the substrate at non-zero angles of incidence relative to normal than at normal incidence.

2. The display of claim 1, wherein the optical isolation structure is adapted to reflect more than 40% of light incident on the optical isolation structure from within the substrate at angles greater than 70 degrees relative to normal to the optical isolation structure.

3. The display of claim 1, wherein the display elements comprise interferometric modulators.

4. The display of claim 1, wherein the display elements comprise liquid crystal elements.

5. The display of claim 1, wherein the display elements comprise electrophoretic elements.

6. The display of claim 1, the optical isolation structure comprising multiple interference layers.

7. The display of claim 1, wherein the material layers are dielectric material.

8. The display of claim 1, wherein the transparent substrate comprises glass.

9. The display of claim 1, comprising a light source positioned to direct light into an edge of the substrate.

10. The display of claim 9, wherein the light source is configured to direct light into the edge of the substrate substantially at angles greater than about 70 degrees relative to normal to the layers.

11. The display of claim 1, comprising a plurality of light redirectors disposed adjacent to the transparent substrate, the light redirectors configured to redirect light incident on the light directors into the display elements.

12. The display of claim 11, wherein the light redirectors are configured to redirect light incident on the light directors at angles greater than 70 degrees relative to normal to the layers into the display elements.

13. The display of claim 11, wherein the light redirectors are disposed in a film disposed on the substrate.

14. The display of claim 13, wherein the light redirectors comprise angled surfaces of the film.

15. The display of claim 1, wherein the optical isolation structure is adapted to transmit more than 80% of light incident on the optical isolation structure at angles less than 30 degrees relative to normal to the optical isolation structure.

16. The display of claim 1, further comprising:
   a processor that is in electrical communication with said display elements, said processor being configured to process image data; and
   a memory device in electrical communication with said processor.

17. The display of claim 16, further comprising:
   a first controller configured to send at least one signal to said display elements; and
   a second controller configured to send at least a portion of said image data to said first controller.

18. The display of claim 16, further comprising an image source module configured to send said image data to said processor.

19. The display of claim 18, wherein said image source module comprises at least one of a receiver, transceiver, and transmitter.

20. The display of claim 16, further comprising an input device configured to receive input data and to communicate said input data to said processor.

21. The display of claim 1, wherein the display elements comprise microelectromechanical systems.

22. The display of claim 1, wherein the display is a reflective display.

23. The display of claim 1, wherein the display elements comprise a fixed partially reflective layer and a movable reflective layer.

24. The display of claim 1, wherein the substrate supports the display elements and the optical isolation structure.

25. The display of claim 1, wherein the substrate is adjacent to the first material layer.

26. The display of claim 1, wherein the first material layer is disposed over the substrate, the second material layer is disposed over the first material layer, and the third material layer is disposed over the second material layer.

27. A display with integrated front or back light guide, comprising:
   a plurality of display elements;
   an optical isolation structure disposed over the display elements, wherein the optical isolation structure comprises at least a first, second, and third dielectric layer; and
   a transparent substrate disposed over the optical isolation structure, wherein the first dielectric layer has an index of refraction greater than the index of refraction of the transparent substrate, the second dielectric layer has an index of refraction less than the index of refraction of the first dielectric layer, and the third dielectric layer has an index of refraction greater than the index of refraction of the second dielectric layer, and wherein the optical isolation structure is adapted to reflect more light incident on the optical isolation structure from within the substrate at non-zero angles of incidence relative to normal than at normal incidence.

28. The display of claim 27, wherein the optical isolation structure is adapted to reflect more than 40% of light incident on the optical isolation structure from within the substrate at angles greater than 70 degrees relative to normal to the optical isolation structure.

29. The display of claim 27, wherein the display elements comprise microelectromechanical systems.

30. The display of claim 27, wherein the display is a reflective display.

31. The display of claim 27, wherein the display elements comprise a fixed partially reflective layer and a movable reflective layer.

32. The display of claim 27, wherein the substrate supports the display elements and the optical isolation structure.

33. The display of claim 27, wherein the substrate is adjacent to the first dielectric layer.

34. The display of claim 27, wherein the first dielectric layer is disposed over the substrate, the second dielectric layer is disposed over the first dielectric layer, and the third dielectric layer is disposed over the second dielectric layer.

35. A display, comprising:
    a plurality of display elements; and
    at least a first, second and third interference layer disposed over the display elements, wherein the interference layers are adapted to reflect more than 40% of light incident on the layers at angles greater than 70 degrees relative to normal to the layers, wherein the first interference layer has an index of refraction greater than 1.5109, the second interference layer has an index of refraction less than the index of refraction of the first interference layer, and the third interference layer has an index of refraction greater than the index of refraction of the second interference layer.

36. The display of claim 35, wherein the display elements comprise interferometric modulators.

37. The display of claim 35, wherein the display elements comprise liquid crystal elements.

38. The display of claim 35, wherein the display elements comprise electrophoretic elements.

39. The display of claim 35, wherein each interference layer is a dielectric material.

40. The display of claim 35, wherein the interference layers are adapted to transmit more than 80% of light incident on the layers at angles less than 30 degrees relative to normal to the layers.

41. The display of claim 35, wherein the display elements comprise microelectromechanical systems.

42. The display of claim 35, wherein the display is a reflective display.

43. The display of claim 35, wherein the display elements comprise a fixed partially reflective layer and a movable reflective layer.

44. The display of claim 35, wherein the third interference layer is disposed over the display elements, the second interference layer is disposed over the third interference layer, and the first interference layer is disposed over the second interference layer.

45. A light guide, comprising:
    a transparent substrate; and
    a plurality of material layers disposed on the transparent substrate, wherein the plurality of material layers comprise a first material layer disposed over the transparent substrate having an index of refraction greater than the transparent substrate, a second material layer disposed over the first material layer having an index of refraction lower than the first material layer, and a third material layer disposed over the second material layer having an index of refraction greater than the second material layer, wherein the combined plurality of material layers is adapted to reflect more than 40% of light incident on the plurality of material layers within the substrate at angles greater than 70 degrees relative to normal to the plurality of material layers.

46. The light guide of claim 45, wherein the transparent substrate is glass.

47. The light guide of claim 45, wherein the material layers are interference layers.

48. The light guide of claim 45, comprising a plurality of light redirectors disposed on the transparent substrate opposite the plurality of material layers, the light redirectors configured to redirect light incident on the light redirectors at angles greater than 60 degrees relative to normal to the layers through the material layers at angles less than 60 degrees relative to normal to the layers.

49. The light guide of claim 48, wherein the light redirectors are disposed in a film disposed on the substrate.

50. The light guide of claim 49, wherein the light redirectors comprise angled surfaces of the film.

51. The light guide of claim 45, wherein the combined plurality of material layers are adapted to transmit more than 80% of light incident on the plurality of material layers at angles less than 30 degrees relative to normal to the plurality of material layers.

52. A display, comprising:
    means for displaying image content;
    means disposed over the displaying means for reflecting light; and
    means disposed over the reflecting means for propagating light, wherein the reflecting means comprises at least a first, second, and third material layer, wherein the first material layer has an index of refraction greater than the index of refraction of the propagating means, the second material layer has an index of refraction less than the index of refraction of the first material layer, and the third material layer has an index of refraction greater than the index of refraction of the second material layer, and wherein the reflecting means is adapted to reflect more light incident on the reflecting means from within the propagating means at non-zero angles of incidence relative to normal than at normal incidence.

53. The display of claim 52, wherein the displaying means comprise a plurality of display elements.

54. The display of claim 52, wherein the first, second, and third material layers comprise interference layers.

55. The display of claim 52, wherein the first, second, and third material layers comprise dielectric layers.

56. The display of claim 52, wherein the propagating means is a transparent substrate.

57. The display of claim 56, wherein the transparent substrate is glass.

58. The display of claim 52, wherein the displaying means comprises interferometric modulators.

59. The display of claim 52, wherein the propagating means supports the displaying means and the reflecting means.

60. The display of claim 52, wherein the propagating means is adjacent to the first material layer.

61. The display of claim 52, wherein the first material layer is disposed over the propagating means, the second material layer is disposed over the first material layer, and the third material layer is disposed over the second material layer.

* * * * *